United States Patent
Meng et al.

(10) Patent No.: US 8,953,948 B2
(45) Date of Patent: Feb. 10, 2015

(54) OPTICAL TRANSPORT NETWORK SYNCHRONIZATION AND TIMESTAMPING SYSTEMS AND METHODS

(75) Inventors: Hongxing Meng, Cumming, GA (US); Abhishek Chaudhary, Alpharetta, GA (US); Gustav Karl Larsson, Sunnyvale, CA (US); Saravanan Purushothaman, Alpharetta, GA (US)

(73) Assignee: Ciena Corporation, Hanover, MD (US)

( * ) Notice: Subject to any disclaimer, the term of this patent is extended or adjusted under 35 U.S.C. 154(b) by 439 days.

(21) Appl. No.: 13/302,791

(22) Filed: Nov. 22, 2011

(65) Prior Publication Data

US 2013/0129345 A1    May 23, 2013

(51) Int. Cl.
*H04B 10/00* (2013.01)
*H04J 3/06* (2006.01)
*H04J 3/16* (2006.01)

(52) U.S. Cl.
CPC ............ *H04J 3/0682* (2013.01); *H04J 3/1652* (2013.01); *H04J 2203/006* (2013.01)
USPC ............................. 398/154; 398/25; 398/33

(58) Field of Classification Search
CPC ........... H04B 17/0037; H04B 17/0047; H04B 10/299; H04B 10/079; H04J 14/02
USPC ........................ 398/25, 33, 52–53, 154–155
See application file for complete search history.

(56) References Cited

U.S. PATENT DOCUMENTS

| | | | |
|---|---|---|---|
| 6,947,376 B1 | 9/2005 | Deng et al. | |
| 7,512,674 B1 | 3/2009 | Jain et al. | |
| 7,936,260 B2 | 5/2011 | Williamson et al. | |
| 8,015,278 B1 | 9/2011 | Papa et al. | |
| 2008/0114581 A1 | 5/2008 | Meir et al. | |
| 2008/0114874 A1 | 5/2008 | Meir et al. | |
| 2008/0240077 A1 | 10/2008 | Freiberger | |
| 2008/0276253 A1 | 11/2008 | Khandrika et al. | |
| 2008/0285449 A1 | 11/2008 | Larsson et al. | |
| 2009/0129777 A1 | 5/2009 | Singh | |
| 2009/0147806 A1* | 6/2009 | Brueckheimer | 370/503 |
| 2009/0208206 A1 | 8/2009 | Madrahalli et al. | |
| 2010/0036939 A1 | 2/2010 | Yang et al. | |
| 2010/0082632 A1 | 4/2010 | Kumar | |
| 2011/0076031 A1 | 3/2011 | Surek et al. | |
| 2011/0170860 A1* | 7/2011 | Smith et al. | 398/25 |
| 2011/0200051 A1 | 8/2011 | Rivaud et al. | |
| 2011/0216816 A1* | 9/2011 | Frenzel | 375/222 |
| 2011/0231566 A1* | 9/2011 | Gelter et al. | 709/231 |
| 2011/0262128 A1 | 10/2011 | Madrahalli et al. | |
| 2013/0202291 A1* | 8/2013 | Cavaliere et al. | 398/33 |
| 2014/0079409 A1* | 3/2014 | Ruffini et al. | 398/154 |

* cited by examiner

*Primary Examiner* — Dzung Tran
(74) *Attorney, Agent, or Firm* — Clements Bernard PLLC; Christopher L. Bernard; Lawrence A. Baratta, Jr.

(57) ABSTRACT

The present disclosure provides to Optical Transport Network (OTN_ synchronization systems and methods that maintain proper sequential ordering of events at nodes which may be utilized in performing root cause analysis or diagnosing network performance. In an exemplary embodiment, the systems and methods utilize functionality incorporated into OTN providing a cost effective and standards-based approach to nodal synchronization. Once synchronized, network events are logged with an appropriate timestamp enabling a determination of a sequential order of network events can be determined. Further, the node timestamps may be synchronized, with microsecond or even sub-microsecond of precession which is critical in diagnosing network failures or slow traffic recovery.

18 Claims, 7 Drawing Sheets

OPTICAL TRANSPORT NETWORK SYNCHRONIZATION AND TIMESTAMPING SYSTEMS AND METHODS

CROSS-REFERENCE TO RELATED APPLICATION(S)

The present application relates to U.S. patent application Ser. No. 13/032,790 filed Feb. 23, 2011 and entitled "NETWORK ELEMENT CLOCK SYNCHRONIZATION SYSTEMS AND METHODS USING OPTICAL TRANSPORT NETWORK DELAY MEASUREMENT," the contents of which are herein incorporated by reference.

FIELD OF THE INVENTION

The present invention relates generally to optical networking systems and methods. More particularly, the present invention relates to Optical Transport Network (OTN) synchronization and timestamping systems and methods which enable proper sequential ordering of network events which may be utilized in performing root cause analysis or diagnosing network performance.

BACKGROUND OF THE INVENTION

In troubleshooting failures or performance of protected networks, it is often required to determine the sequential order of relevant logged events of all nodes in a network, or the timestamps of a particular event across all the nodes in the network. For example, a protected network may include Optical Transport Network (OTN) as defined in ITU-T G.709 (December 2009) "Interfaces for the Optical Transport Network (OTN)" and G.798 (October 2010) "Characteristics of optical transport network hierarchy equipment functional blocks," the contents of each are incorporated by reference herein. An OTN protected network may also include a control plane which performs automatic service provisioning and restoration. Thus, when a mesh-protected circuit fails and mesh restoration occurs, an overwhelmingly large number of events are generated by both the control plane and a data plane at various nodes in the network. To diagnose a root cause of a mesh restoration failure or high switching time, it is critically important to find out the sequential order or the timestamps of relevant events across the network. Generally in OTN, each node maintains its own internal clock. In the case network failure or mesh restoration, diagnosing root cause requires highly experienced engineers or network operators to manually go through many logged network events and determine an order of the relevant events. Such a process is extremely tedious and fraught with error even in a small network and practically impossible in a large network.

An exemplary conventional solution may include a software tool to automate the event sequences in an offline manner. However, such a software tool has disadvantages including relying on internal, proprietary aspects of the event logging, accuracy within only several milliseconds, and generally lacking a systematic way of managing the system. Further, protocols such as Network Time Protocol (NTP), Global Positioning System (GPS), and Precision Time Protocol (PTP) (IEEE 1588-2002 and IEEE 1588-2008) could be implemented to synchronize the clocks of nodes across the network. However, such protocols are either not available or not cost effective in Time Division Multiplexing (TDM) networks. Also, such protocols may lack precision to within tens of milliseconds. Note, having accuracy within milliseconds inevitably causes improper ordering of network events. Furthermore, it may be desired in some cases that each node in the network maintain an independent clock (e.g., nodes are physically located in different time zones) and yet the sequential order of events needs to be determined.

BRIEF SUMMARY OF THE INVENTION

In an exemplary embodiment, a method for synchronization and timestamp mapping in an optical network includes classifying a first node as a master node and a second node as a slave node; performing a delay measurement between the master node and the slave node, the slave node determining a second time reference based on when the slave node responds to the delay measurement from the master node; upon completion of the delay measurement, sending from the master node a measured delay and a first time reference to the slave node, the delay including a measured delay between the master node and the slave node, and the time reference including a time when the master node receives the slave node's response to the delay measurement; and utilizing the measured delay, the first time reference, and the second time reference by the master node and the slave node to determine a sequential order of events therebetween. The method may further include defining a mapping between the master node and the slave node based on the measured delay, the first time reference, and the second time reference; and logging events at each of the master node and the slave node with the mapping utilized to sequentially order the events. The method may further include operating Optical Transport Network on a link between the master node and the slave node. The method may further include selecting one of a plurality of ports on the link; and performing the delay measurement utilizing delay measurement data in overhead of the one of the plurality of ports.

The method may further include determining the delay and the first time reference based on a time associated with a clock on the master node instead of counting a number of frames. The method may further include performing a plurality of delay measurements to obtain a plurality of values for the delay, the first time reference, and the second time reference; and applying statistics to the plurality of values to determine the delay, the first time reference, and the second time reference. The method may further include providing events from the master node and the slave node to a management system; and utilizing the measured delay, the first time reference, and the second time reference to store the events in an event log in proper sequential order. The method may further include performing the delay measurement only if the link is free from defects or errors associated with Optical Transport Network. The method may further include sending from the master node a measured delay and a first time reference to the slave node utilizing a control plane. The method may further include operating a plurality of nodes in addition to the first node and the second node; defining a tree of ordered nodes including the plurality of nodes, the first node, and the second node, wherein the ordering of the nodes is based on one or more criteria; and performing the classifying, the performing, the sending, and the utilizing steps in a recursive manner through the tree to define a network-wide mapping between each of the plurality of nodes, the first node, and the second node. The method may further include utilizing the network-wide mapping to determine a sequential order of events between the plurality of nodes, the first node, and the second node.

In another exemplary embodiment, an optical network includes a first node; a second node; and a plurality of Optical Transport Network ports on a link between the first node and the second node; wherein the first node and the second node are configured to perform synchronization and timestamp mapping therebetween, the synchronization and timestamp mapping includes the first node performing a delay measurement with the second node, the second node determining a second time reference based on when the second node responds to the delay measurement from the first node; upon completion of the delay measurement, the first node sending a measured delay and a first time reference to the second node, the delay including a measured delay between the first node and the second node, and the time reference including a time when the first node receives the second node's response to the delay measurement; and the first node and the second node utilizing the measured delay, the first time reference, and the second time reference to determine a sequential order of events therebetween. The synchronization and timestamp mapping may further include the first node and the second node defining a mapping therebetween based on the measured delay, the first time reference, and the second time reference; and the first node and the second node each logging events with the mapping utilized to sequentially order the events.

The synchronization and timestamp mapping may further include the first node selecting one of the plurality of Optical Transport Network ports; and the first node and the second node performing the delay measurement utilizing delay measurement data in overhead of the one of the plurality of Optical Transport Network ports. Also, the delay measurement could be utilizing the overhead (DMp or DMti) in the lower multiplexed OTN layer. The synchronization and timestamp mapping may further include the first node determining the delay and the first time reference based on a time associated with a clock on the first node instead of counting a number of frames. The synchronization and timestamp mapping may further include the first node and the second node performing a plurality of delay measurements to obtain a plurality of values for the delay, the first time reference, and the second time reference; and the first node applying statistics to the plurality of values to determine the delay, the first time reference, and the second time reference. The optical network may further include a management system communicatively coupled to the first node and the second node; wherein the management system is configured to receive events from the first node and the second node, and to utilize the measured delay, the first time reference, and the second time reference to store the events in an event log in proper sequential order.

The optical network may further include a control plane operating between the first node and the second node, wherein the control plane is configured to communicate the measured delay and the first time reference to the second node from the first node. The optical network may further include a plurality of nodes in addition to the first node and the second node, the plurality of nodes communicatively coupled to the first node and the second node through a plurality of links operating Optical Transport Network; wherein the synchronization and timestamp mapping further includes a tree of ordered nodes including the plurality of nodes, the first node, and the second node, wherein the ordering of the nodes is based on one or more criteria; and wherein the synchronization and timestamp mapping is performed recursive manner through the tree to define a network-wide mapping between each of the plurality of nodes, the first node, and the second node.

In yet another exemplary embodiment, a network element includes a plurality of ports configured to be switched therebetween; and a control module communicatively coupled to the plurality of ports, wherein the control module is configured to define a node communicatively coupled to one of the plurality of ports as a slave node; perform a delay measurement to the slave node, the slave node determining a second time reference based on when the slave node responds to the delay measurement from the network element; upon completion of the delay measurement, sending a measured delay and a first time reference to the slave node, the delay including a measured delay to the slave node, and the time reference including a time when the network element receives the slave node's response to the delay measurement; and utilizing the measured delay, the first time reference, and the second time reference by to determine a sequential order of events between the network element and the slave node.

BRIEF DESCRIPTION OF THE DRAWINGS

Exemplary and non-limiting embodiments of the present invention are illustrated and described herein with reference to the various drawings, in which like reference numbers denote like method steps and/or system components, respectively, and in which.

DETAILED DESCRIPTION OF THE INVENTION

In various exemplary embodiments, the present invention relates to OTN synchronization and timestamping systems and methods that maintain proper sequential ordering of events at nodes which may be utilized in performing root cause analysis or diagnosing network performance. In an exemplary embodiment, the systems and methods utilize functionality incorporated into OTN providing a cost effective and standards-based approach to nodal synchronization and timestamp mapping. Once synchronized and/or once a timestamp map is derived, network events are logged with an appropriate timestamp enabling a determination of a sequential order of network events to be determined. Further, the node timestamps may be synchronized, with microsecond or even sub-microsecond of precession which is critical in diagnosing network failures or slow traffic recovery. The systems and methods are flexible and may be on demand or periodically scheduled. The systems and methods may be utilized by network engineers and operators to troubleshoot, perform root cause analysis, or generally diagnosis network performance.

Figure 1:
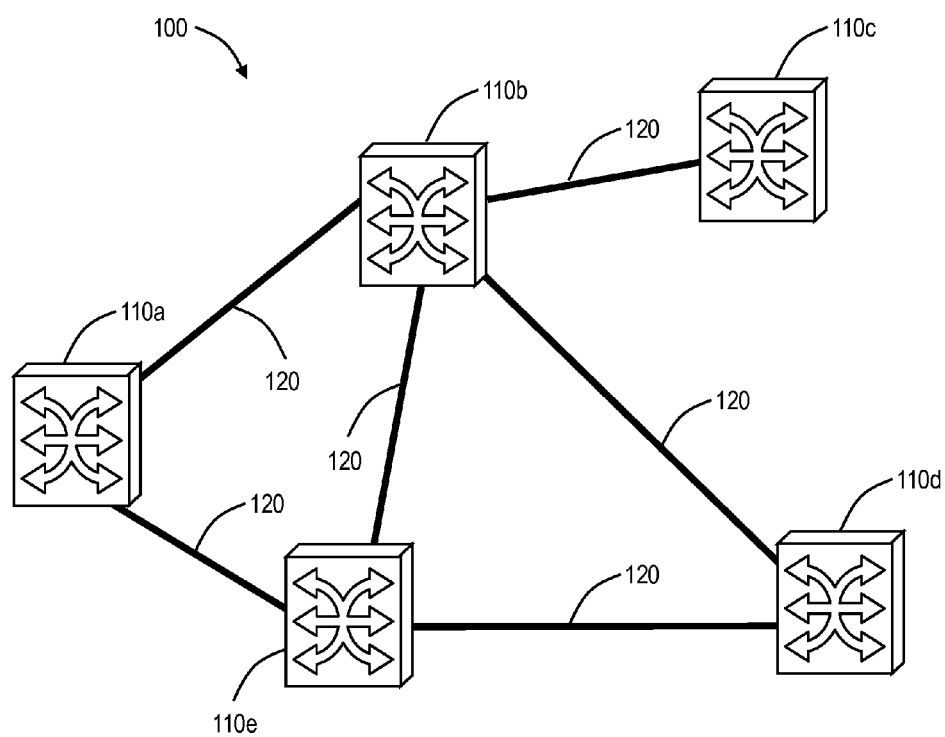
FIG. 1 is a network diagram of an exemplary network with five interconnected nodes for Optical Transport Network (OTN) synchronization systems and methods.

Referring to FIG. 1, in an exemplary embodiment, a network diagram illustrates an exemplary network 100 with five interconnected nodes 110a, 110b, 110c, 110d, 110e. The nodes 110 are interconnected through a plurality of links 120. In particular, the nodes 110 communicate with one another over the links 120 through a Layer 1 protocol such as OTN. The nodes 110 may generally be network elements which include a plurality of ingress and egress ports forming the links 120. More particularly, the nodes 110 may include, for example, a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the nodes 110 may include a SONET add/drop multiplexer (ADM), an SDH ADM, an OTN ADM, a SONET/SDH/OTN ADM, a multi-service provisioning platform (MSPP), a digital cross-connect (DCS), an optical switch, a cross connect, etc.

Each of the nodes 110 may include common equipment that is configured to provide operations, administration, maintenance, and provisioning (OAM&P) functionality for the nodes 110 and the network 100. The common equipment may further be configured to communicatively couple the nodes 110 to an external system such as a network management system (NMS), element management system (EMS), etc. Each of the nodes 110 may further include a method for unique node identification (ID) such as a unique node ID. Note, this unique node ID may be unique only within context of the network 100. In the systems and methods described herein, the unique node ID may be utilized as a method to uniquely identify each node 110. Additionally, the nodes 110 may each include a local clock which is used by the systems and methods to log events associated with the node 110 and the network 100. As described herein, events refer to anything that is logged by the node 110 such as, for example, alarms, performance monitoring (PM), provisioning events, switching events, fault events, and generally anything related to OAM&P.

In the network 100 or any other protected network, many factors or events may cause network failures, protection switching, network traffic re-routing, and the like. In finding the root causes of failures or diagnosing the performance of the network, a control plane frequently requires determining the order and time of events among all of the nodes 110 within the network 100. In various exemplary embodiments, the synchronization and timestamping systems and methods are configured to maintain accurate local clocks and/or a timestamp map between the nodes 110 such that nodal events may be logged with proper sequencing. These properly sequenced nodal events may be communicated with the NMS, EMS, etc. and presented to an end user for fault root cause analysis, performance diagnostics, etc. Thus, an output of the synchronization and timestamping systems and methods may include an event log with a proper sequence of events relative to one another.

In an exemplary embodiment, the synchronization and timestamping systems and methods may be configured to determine the sequential order of events of all nodes in a TDM OTN network, such as the nodes 110 in the network 100, using a delay measurement functionality of OTN and modifications therein combined with a timestamp-based algorithm. The algorithm may be utilized to synchronize or provide a relative mapping of the timestamps of all the nodes 110 within the network 100. The systems and methods may utilize functionality for delay measurement recently incorporated into ITU-T G.709 (December 2009) and G.798 (October 2010) that are available in ITU G.709/G.798 OTN-compliant networks and may be utilized with the timestamp-based algorithm to yield precision of sub-microseconds in determining the sequential order of events or timestamps of all the nodes 110 on the network 100. With the nodes 110 in the network 100 synchronized therebetween with respect to their internal clocks or with a timestamp map between the nodes 110, the systems and methods provide a systematic mechanism of determining the sequential order of events or timestamps of events across the network 100.

Figure 2:
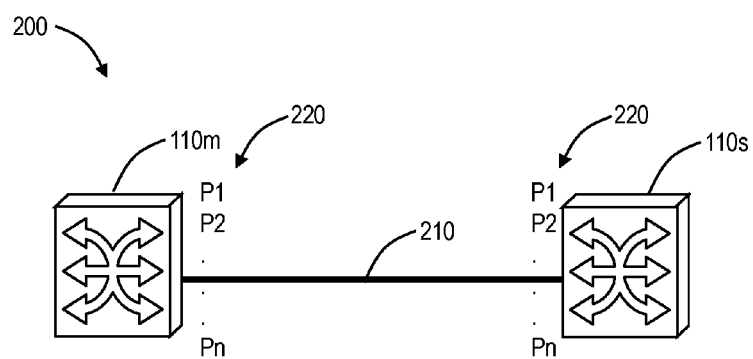
FIG. 2 is a network diagram of a network of two nodes designated as master and slave for the OTN synchronization systems and methods.

Referring to FIG. 2, in an exemplary embodiment, a network diagram illustrates a network 200 of two nodes 110m, 110s interconnected through a link 210. Note, the network 200 may be a subset of a larger network, such as the network 100. For example, the node 110m may be the node 110a in FIG. 1 and the node 110s may be the node 110b in FIG. 1. Each of the nodes 110m, 110s include one or more ports 220 (labeled as P1, P2, . . . Pn) on the link 210 between the nodes 110m, 110s. The network 200 illustrates an example of classifying nodes 110 as master and slave based on some criteria such as, for example, node ID. In this exemplary network 200, the node 110m is the master and the node 110s is the slave. Further, the link 210 may include a plurality of links or lines between the nodes 110m, 110s. Specifically, between any two neighboring nodes, there may be more than one link but only one is used for the network synchronization. In the synchronization and timestamping systems and methods, the classification of the nodes 110 as master and slave is utilized to perform internal clock synchronization. In an exemplary embodiment, a method may be implemented network-wide using the master and slave designations to fully synchronize the internal clocks therebetween.

Figure 3:
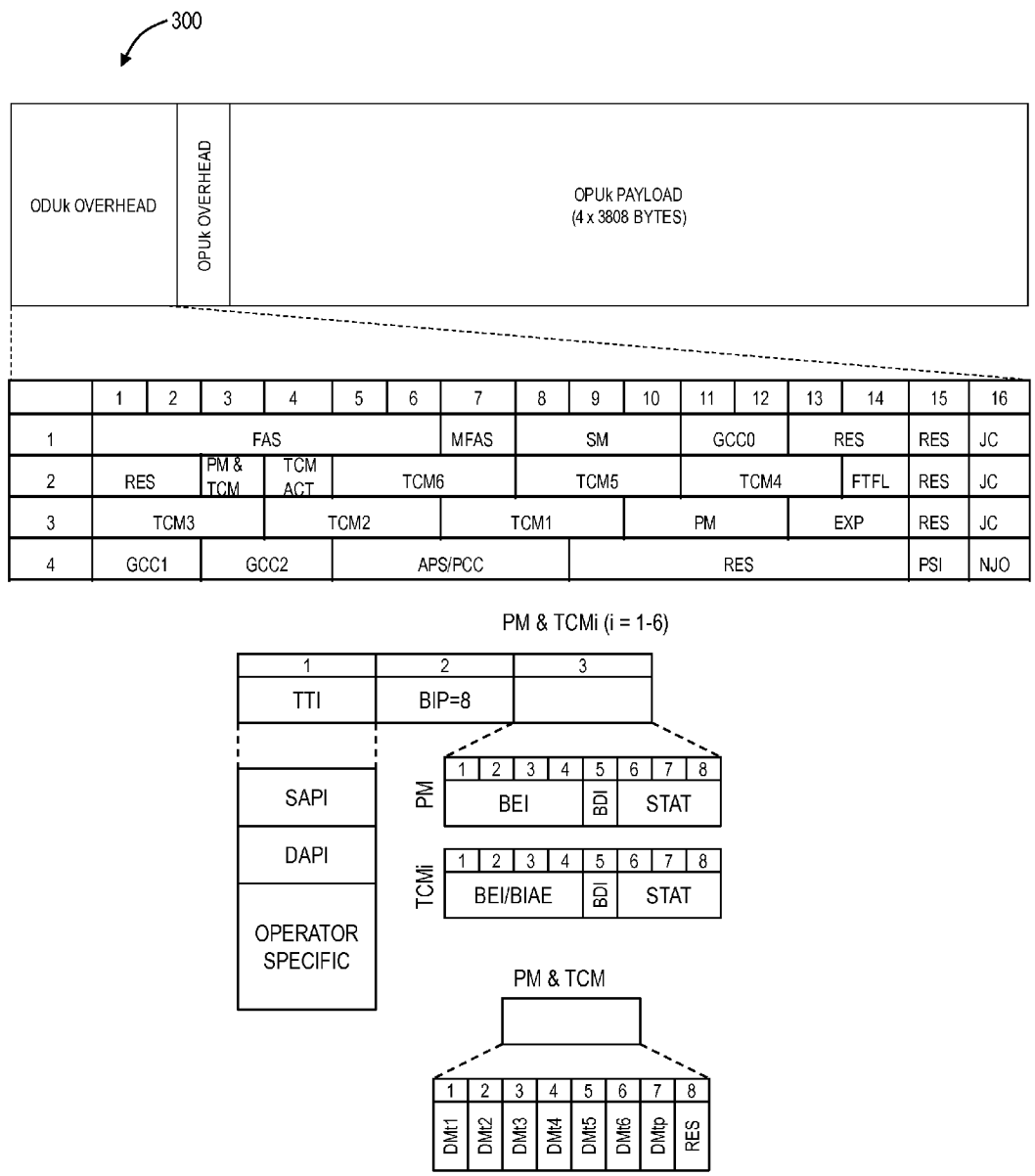
FIG. 3 is a block diagram of ITU-T G.709 overhead for use in the networks of FIGS. 1 and 2 and with the OTN synchronization systems and methods.

Referring to FIG. 3, in an exemplary embodiment, G.709 overhead 300 is partitioned into Optical channel Transport Unit (OTU) frame alignment bytes in row 1, columns 1-7; Optical channel Data Unit (ODU) overhead bytes in rows 2-4, columns 1-14; OTU overhead bytes in row 1, columns 8-14; and Optical channel Payload Unit (OPU) overhead in rows 1-4, columns 15-16. Further, the G.709 overhead 300 includes Forward Error Correction (FEC) data (not shown) in the frame. The OTU frame alignment bytes include a frame alignment signal (FAS) bytes and a multi-frame alignment signal (MFAS). Also, the G.709 overhead 300 includes section monitoring (SM) bytes and path monitoring (PM) bytes to provide optical layer error management between optical section and path in G.709. The SM bytes include dedicated BIP-8 monitoring to cover the payload signal. The first byte of the SM used for Trail Trace Identifier (TTI) which is a 64-byte character string similar to a section trace in SONET. The PM bytes include dedicated BIP-8 monitoring to cover the payload signal. The first byte of the PM is used for TTI which is similar to path trace in SONET.

A general communication channel 0 (GCC0) bytes provide a communications channel between adjacent G.709 nodes. The G.709 overhead 300 further includes a payload signal identifier (PSI), justification control (JC), and negative justification opportunity (NJO). For asynchronous clients such as 10 GbE and 10 G FC, NJO and PJO are used as stuff bytes similar to PDH. If the client rate is lower than OPU rate, then extra stuffing bytes may be inserted to fill out the OPU. Similarly, if the incoming signal is slightly higher than the OPU rate, NJO and PJO bytes may be replaced with signal information, i.e. the OPU payload capacity is increased slightly to accommodate the extra traffic on the transceiver, and the JC bytes reflect whether NJO and PJO are data or stuff bytes the JC bytes are used at the off-ramp to correctly de-map the signal. The PSI provides an identification of the payload signal. Further, the G.709 overhead 300 also includes six levels of Tandem Connection Monitoring (TCMn).

At the OTN level, the nodes 110 may be configured to perform Delay Measurement (DM)s via the G.709 overhead 300. Specifically, the nodes 110 may perform a delay measurement of an ODUk path (DMp) or a delay measurement at a particular Tandem Connection (DMti). The delay measurement of an ODUk path is performed via the PM overhead and the delay measurement at a particular Tandem Connection is performed via the TCMn overhead. For ODUk path monitoring, a one-bit path delay measurement (DMp) signal is defined to convey the start of the delay measurement test. The DMp signal includes a constant value (0 or 1) that is inverted at the beginning of a two-way delay measurement test. The transition from 0 to 1 in the sequence . . . 0000011111 . . . , or the transition from 1 to 0 in the sequence . . . 1111100000 . . . represents the path delay measurement start point. The new value of the DMp signal is maintained until the start of the next delay measurement test. This DMp signal is inserted by the DMp originating Path-Connection Monitoring End Point (P-CMEP) and sent to the far-end P-CMEP, e.g. from the node 110m to the node 110s. This far-end P-CMEP loops back the DMp signal towards the originating P-CMEP.

The originating P-CMEP measures the number of frame periods between the moment the DMp signal value is inverted and the moment this inverted DMp signal value is received back from the far-end P-CMEP. The receiver should apply a persistency check on the received DMp signal to be tolerant for bit errors emulating the start of delay measurement indication. The additional frames that are used for such persistency checking should not be added to the delay frame count. The looping P-CMEP should loop back each received DMp bit within approximately 100 μs. The ODUk tandem connection monitoring utilizes the same procedure as the delay measurement of an ODUk path except a DMti signal is between an originating Tandem Connection-Connection Monitoring End Point (TC-CMEP) and a far-end TC-CMEP. The path and the TCM delay measurements can be performed on-demand, to provide the momentary two-way transfer delay status, and pro-active, to provide 15-minute and 24-hour two-way transfer delay performance management snapshots. Of note, these delay measurements are defined in ITU-T G.709 (December 2009) and G.798 (October 2010).

Figure 4:
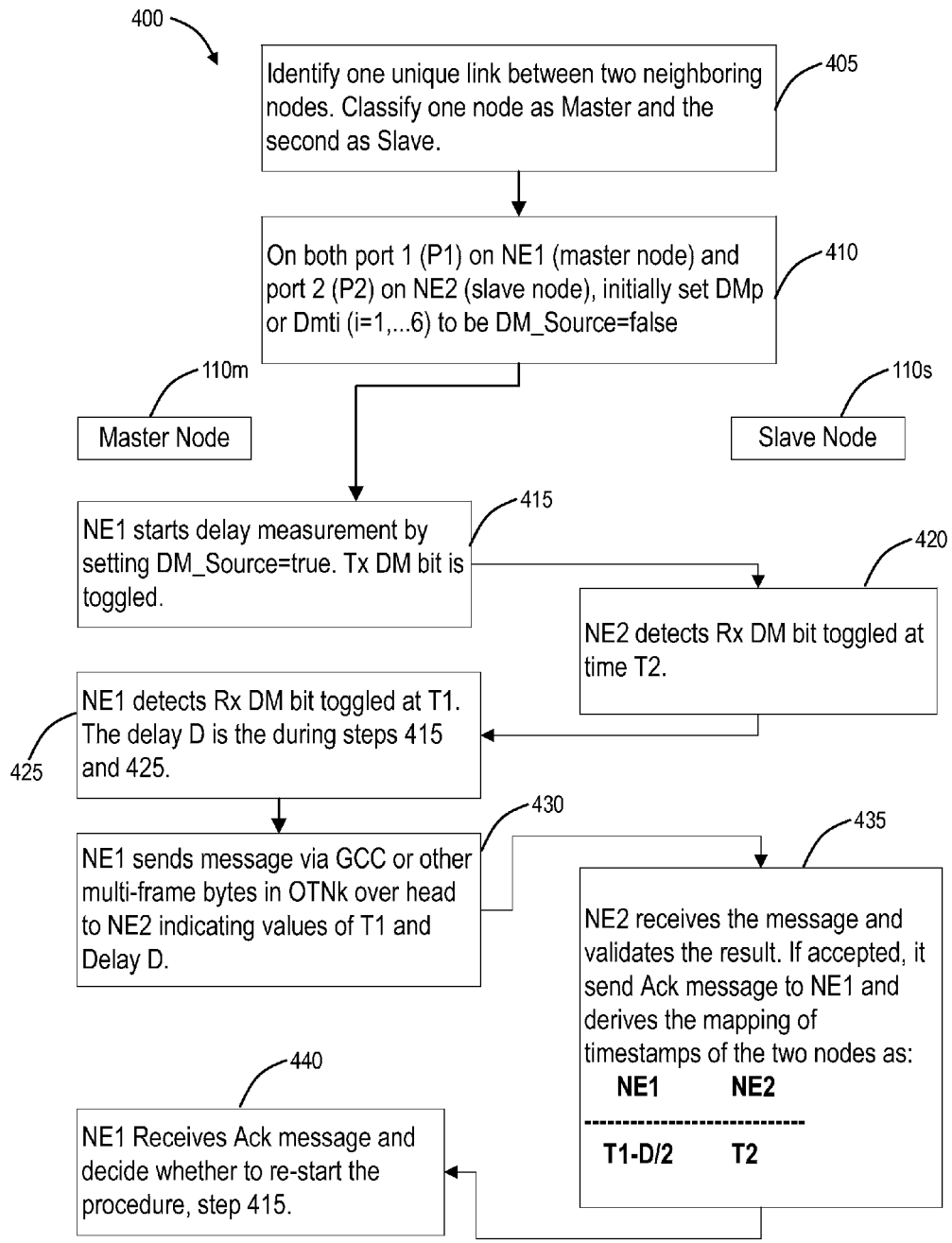
FIG. 4 is a flowchart of an OTN synchronization and timestamp mapping method for the OTN synchronization systems and methods.

Referring to FIG. 4, in an exemplary embodiment, a flowchart illustrates a synchronization and timestamp method 400 for the OTN synchronization and timestamping systems and methods. In particular, the synchronization and timestamp mapping method 400 is configured to determine a map between the timestamps of the two neighboring nodes 110m, 110s. Further, mapping of timestamps across the network 100, 200 is realized by performing the synchronization and timestamp mapping method 400 on all the links 120, 210. Once the mapping of timestamps is achieved, a sequential order of network events may be determined by correlating the timestamps of events across the network nodes 110 and the mappings of timestamps. The synchronization and timestamp mapping method 400 may be performed on demand to provide momentary mapping of timestamps of nodes 110 and/or proactively on a regular or aperiodic basis to provide up-to-date mapping.

The synchronization and timestamp mapping method 400 begins by identifying one unique link between two neighboring nodes 110m, 110s and classifying one of the nodes 110m as a master and the other node 110s as a slave (step 405). On both port 1 (P1) on the master node 110m and port 2 (P2) on the slave node 110s, initially set DMp or Dmti (i=1, . . . 6) to be DM_Source=false (step 410). Note, the method 400 may utilize any port with P1 shown as an example. The master node 110m starts delay measurement at a time T0 by setting DM_Source=true and transmitting a toggled DM bit (step 415). The slave node 110s detects the Rx DM bit toggled at a time T2 (step 420). The master node 110m subsequently detects the Rx DM bit toggled at T1 with the delay being during steps 415 to 425 (step 425). Thus, the synchronization and timestamp mapping method 400 may set a Delay, D, equal to T1−T0. The master node 110m may send, such as via the GCC or other multi-frame bytes in OTNk overhead, a message to the slave node 110s indicating the values of T1 and the Delay D (step 430). The slave node 110s receives the message and validates the result (step 435). Specifically, the slave node 110s may decided to accept the result by sending an acknowledgement (ACK) message to the master node 110m and deriving a mapping of timestamps between the slave node 110s and the master node 110m as:

$$\begin{array}{cc} NE1 & NE2 \\ \hline T1-\dfrac{D}{2} & T2 \end{array}$$

Where NE1 is the master node 110m, NE2 is the slave node 110s, T1 is the time the master node 110m receives a return DM bit from the slave node 110s, T2 is the time the slave node 110s receives a transmitted DM bit from the master node 110m, and D is the determined delay between the master node 110m and the slave node 110s. Thus, events at each of the nodes 110m, 110s may now be synchronized based on the above mapping. Additionally, clocks at the nodes 110m, 110s may also be set or synchronized based on the above mapping. The master node 110m receives the acknowledgement message and decides whether to re-start the procedure at step 415 or to finalize the results (step 440). The step 440 may be triggered by a local timer in the master or the acknowledgement message ACK message from the slave node 110s. If the master node 110m does not receive positive ACK message from the slave node 110s, or a configurable timer expires, the synchronization and timestamp mapping method 400 may be restarted from the beginning.

In particular, the timestamp mapping in the step 435 defines that the timestamp T1−D/2 on NE1 (the master node 110m) corresponds in absolute time to timestamp T2 on NE2 (the slave node 110s). In other words, T1−D/2 on the master node 110m and T2 on the slave node 110s have the same universal time. Note that each node 110 has its own clock and T1 is the timestamp recorded by the clock in the master node 110m and T2 is the time recorded by the clock in the slave node 110s, and D/2 is the delay (time-of-flight) between the two nodes 110m, 110s. For example, T1 may be 10/16/2011 10:10:10.100,100 by the master node's 110m clock, T2 could be 10/16/2011 20:20:20.200,200, and D/2 could be 0.050 milliseconds. Thus, for timestamp mapping, neither node 110m, 110s is required to adjust its clock. In an exemplary embodiment, in order to synchronize the timestamps (not just mapping), the slave node 110s would be required to adjust its clock by shifting its clock by T2−T1+D/2. In above example, the slave node 110s needs to turn its clock by 10 hrs, 10 min, 10 seconds, 100,100 microseconds plus 50 microseconds. After the synchronization, a same universal time/moment will have same timestamp on both nodes 110m, 110s. However, the synchronization and timestamp mapping method 400 does not require the clocks to be synchronized exactly as the timestamp mapping provides a correspondence which may be utilized when viewing the logs.

Additionally, the synchronization and timestamp mapping method 400 may be subject to various constraints and the like. To ensure reliability in the step 415, the master node 110m may only start delay measurement when the port is free defects or errors. For example, the defects or errors may include: Optical channel Transmission Unit level k (OTUk) defect: Alarm Indication Signal (OTUk_dAIS), OTUk defect: Loss of Frame (OTUk_dLOF), OTUk defect: Loss of Multi-frame (OTUk_dLOM), OTUk defect: signal degraded (OTUk_dDEG), OTUk defect: Backward Defect Indication (OTUk_dBDI), OTUk defect: backwards error indication (OTUk_dBEI), Optical channel Data Unit level k (ODUk) ODUk_dAIS, ODUk defect: Locked signal (ODUk_dLCK), ODUk defect: Open Connection Indication (ODUk_dOCI), ODUk_dDEG, ODUk_dBDI, ODUk_dBEI, and the like. Further, the master node 110m and the slave node 110s may be configured to accept T1, T2, and D values only when the link 120, 210 is free from defects or errors such as the foregoing.

Also, the master node 110m and the slave node 110s may apply a persistency check against the received DM bit flip to be tolerant of bit errors. This may be done by including four additional frames before accepting the values of T1, T2, and D. The additional frames do not affect the values of T1, T2, and D. The accuracy of results from the synchronization and timestamp mapping method 400 is dependent on the fluctuation of time required to detect the DM bit flip and log the timestamp. This is generally in the microseconds and may be improved to sub-microsecond by, in step 415, using a real time by the master node 110m to determine T1 and delay D, rather than using number of frames as recommended by G.709. Additionally, the accuracy may be improved through performing the synchronization and timestamp mapping method 400 a plurality of times to take multiple measurements of delay D and applying statistical algorithms to evaluate values of T1, T2, and D.

Additionally, the foregoing synchronization and timestamp mapping method 400 makes a general assumption that the network 200 is symmetric, i.e. the delay from the master node 110m to the slave node 110s is identical to the delay from the slave node 110s to the master node 110m. While there may be slight variations, it is noted that the method 400 is implemented on the same link 210 between the master node 110m and the slave node 110s, i.e. the method 400 does not calculate D, T1, T2 on different paths in opposing directions but rather on the same path in the opposing directions. As such, any variation in the symmetry of the calculation is typically extremely small and does not impact the implementation of the systems and methods described herein.

Figure 5:
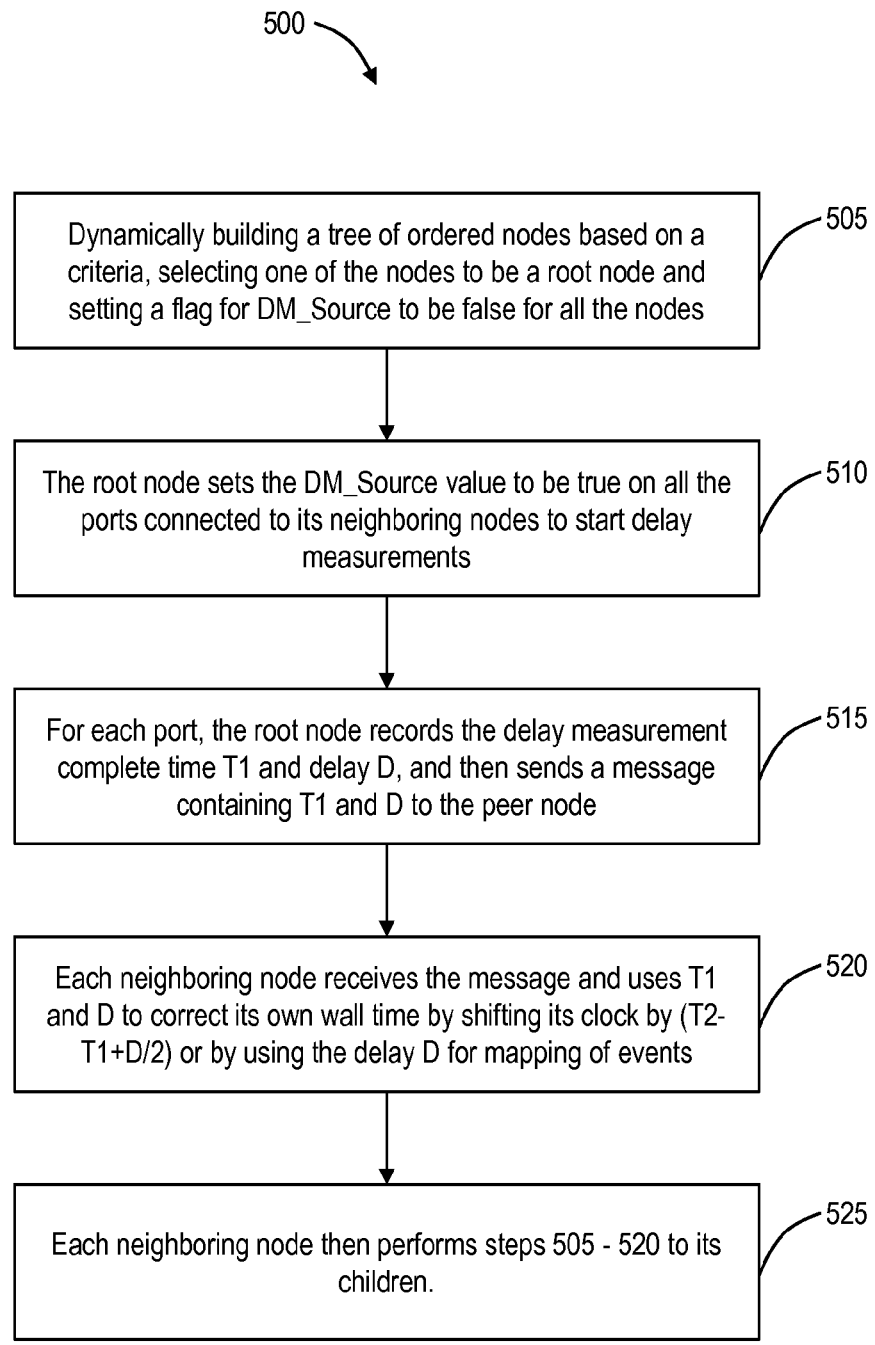
FIG. 5 is a flowchart of a synchronization and timestamp mapping network-wide method expanding the method of FIG. 4 across a plurality of nodes.

Referring to FIG. 5, in an exemplary embodiment, a flowchart illustrates a synchronization and timestamp mapping network-wide method 500 expanding the method 400 across a plurality of nodes 110. In particular, the method 400 provides synchronization and timestamp mapping between two nodes 110m, 110s. In context of the network 100 and other networks, the systems and methods described herein may require synchronization and timestamp mapping network-wide. In an exemplary embodiment, the mapping of timestamps across the network 100, 200 may be realized by performing the synchronization and timestamp mapping methods 400, 500 on all the links 120, 210. The network-wide method 500 begins with dynamically building a tree of ordered nodes based on a criteria, selecting one of the nodes 110 to be a root node and setting a flag for DM_Source to be false for all the nodes 110 (step 515). For example, the criteria may include any mechanism to differentiate between the nodes 110 such as, for example, node ID, etc. The root node sets the DM_Source value to be true on all the ports connected to its neighboring nodes 110 to start delay measurements (step 510). For each port, the root node records the delay measurement complete time T1 and delay D, and then sends a message containing T1 and D to the peer node, such as through the control plane, overhead, etc. (step 515). Each neighboring node receives the message and uses T1 and D to correct its own wall time by shifting its clock by (T2−T1+D/2) or by using the delay D for mapping of events (step 520). To capture the entire network, each neighboring node then performs steps 505 through 520 to its children, etc.

Figure 6:
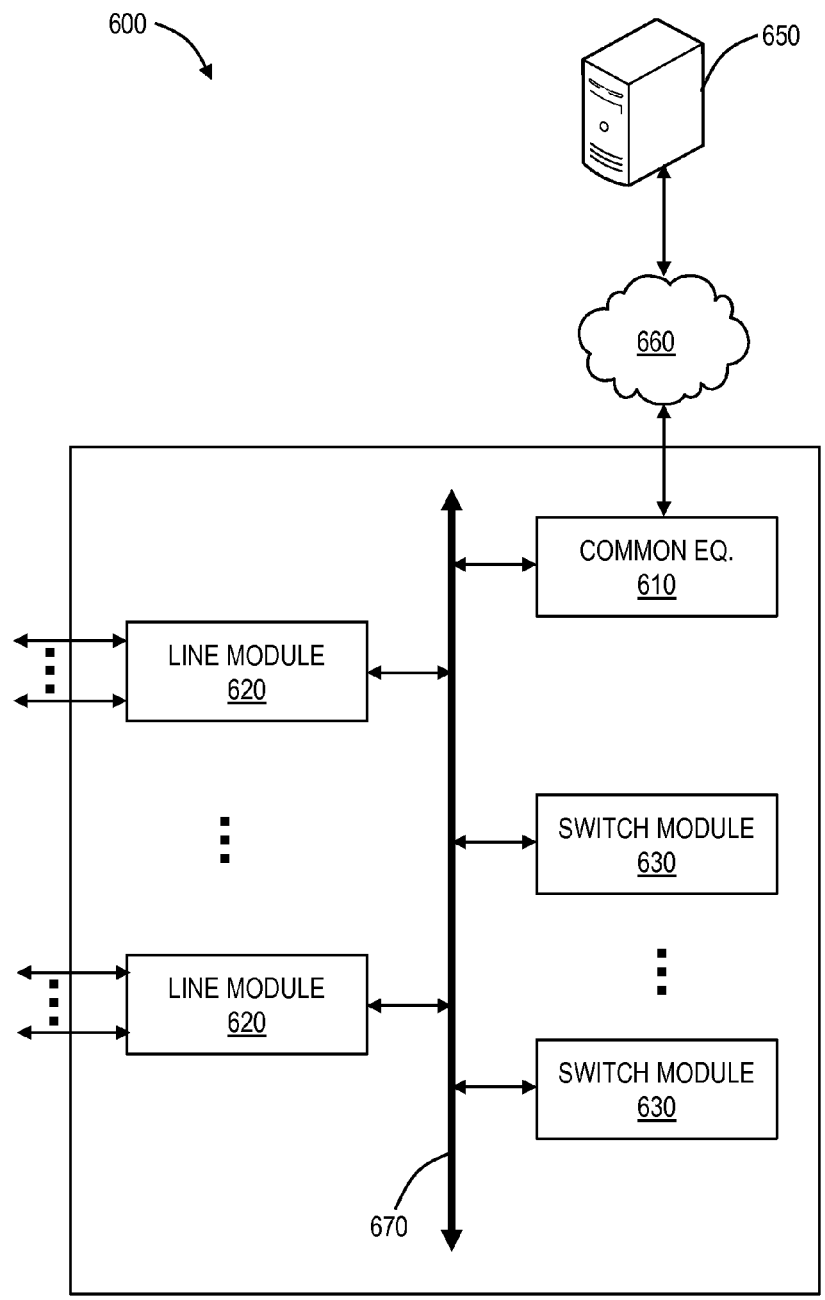
FIG. 6 is a block diagram of an exemplary optical network element for implementation of the node in FIGS. 1 and 2.

Referring to FIG. 6, in an exemplary embodiment, a block diagram illustrates an exemplary optical network element 600 for implementation of the node 110. In an exemplary embodiment, the network element 600 is a nodal device that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 600 may include a SONET add/drop multiplexer (ADM), an SDH ADM, an OTN ADM, a multi-service provisioning platform (MSPP), a digital cross-connect (DCS), etc. In an exemplary embodiment, the network element 600 includes common equipment 610, one or more line modules (LM) 620, and one or more switch modules (SM) 630. The common equipment 610 may include power; a control module; operations, administration, maintenance, and provisioning (OAM&P) access; and the like. The common equipment 610 may connect to a management system 650 through a data communication network 660. The management system 650 may include a network management system (NMS), element management system (EMS), or the like. Additionally, the common equipment 610 may include a control plane processor configured to operate a control plane and the systems and methods described herein.

The network element 600 may include an interface 670 for communicatively coupling the common equipment 610, the line modules 620, and the switch modules 630 therebetween. For example, the interface 670 may include a backplane, mid-plane, a bus, optical or electrical connectors, or the like. The line modules 620 are configured to provide ingress and egress to the switch modules 630, and are configured to provide interfaces for the OTN services described herein. In an exemplary embodiment, the line modules 620 may form ingress and egress switches with the switch modules 630 as center stage switches for a three-stage switch, e.g. a three stage Clos switch. The line modules 620 may include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10GbE PHY), 40 Gb/s (OC-768/STM-256, OTU3, ODU3, 40GbE PHY), 100 Gb/s (OTU4, ODU4, 100GbE PHY), etc. Further, the line modules 620 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 620 may include DWDM interfaces, short reach interfaces, and the like, and may connect to other line modules 620 on remote NEs, end clients, the edge routers, and the like. From a logical perspective, the line modules 620 provide ingress and egress ports to the network element 600, and each line module 620 may include one or more physical ports.

The switch modules 630 are configured to switch services between the line modules 620. For example, the switch modules 630 may provide wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 1006 may include both Time Division Multiplexed (TDM) (i.e., circuit switching) and packet switching engines. The switch modules 630 may include redundancy as well, such as 1:1, 1:N, etc. Those of ordinary skill in the art will recognize the network element 600 may include other components which are omitted for simplicity, and that the systems and methods described herein are contemplated for use with a plurality of different network elements with the network element 600 presented as an exemplary type of network element. For example, in another exemplary embodiment, the network element 600 may not include the switch modules 630, but rather have the corresponding functionality in the line modules 620 (or some equivalent) in a distributed fashion. For the network element 600, other architectures providing ingress, egress, and switching therebetween are also contemplated for the systems and methods described herein.

Figure 7:
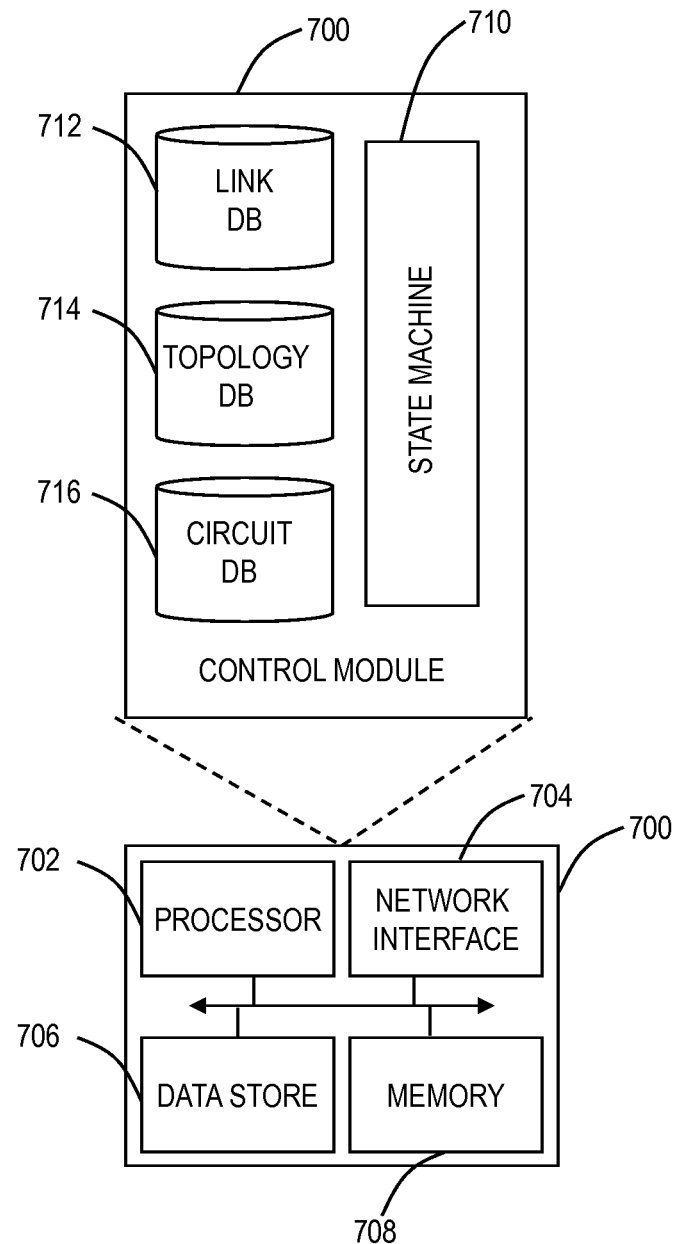
FIG. 7 is a block diagram of a control module to provide control plane processing and/or OAM&P for a node such as the network element of FIG. 6.

Referring to FIG. 7, in an exemplary embodiment, a block diagram illustrates a control module 700 to provide control plane processing and/or OAM&P for a node such as the network element 600. The control module 700 may be part of common equipment, such as common equipment 610 in the network element 600. The control module 700 may include a processor 702 which is hardware device for executing software instructions such as operating the control plane. The processor 702 may be any custom made or commercially available processor, a central processing unit (CPU), an auxiliary processor among several processors associated with the control module 700, a semiconductor-based microprocessor (in the form of a microchip or chip set), or generally any device for executing software instructions. When the control module 700 is in operation, the processor 702 is configured to execute software stored within memory, to communicate data to and from the memory, and to generally control operations of the control module 700 pursuant to the software instructions.

The control module 700 may also include a network interface 704, a data store 706, memory 708, and the like, all of which are communicatively coupled therebetween and with the processor 702. The network interface 704 may be used to enable the control module 700 to communicate on a network, such as to communicate control plane information to other control modules, to the management system 660, and the like. The network interface 704 may include, for example, an Ethernet card (e.g., 10BaseT, Fast Ethernet, Gigabit Ethernet) or a wireless local area network (WLAN) card (e.g., 802.11a/b/g). The network interface 704 may include address, control, and/or data connections to enable appropriate communications on the network. The data store 706 may be used to store data, such as control plane information, provisioning data, OAM&P data, etc. The data store 706 may include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 706 may incorporate electronic, magnetic, optical, and/or other types of storage media. The memory 708 may include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 708 may incorporate electronic, magnetic, optical, and/or other types of storage media. Note that the memory 708 may have a distributed architecture, where various components are situated remotely from one another, but may be accessed by the processor 702.

From a logical perspective, the control module 700 may include a state machine 710, a link database (DB) 712, a topology DB 714, and a circuit DB 716. The control module 700 may be responsible for all control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane may utilize Automatically Switched Optical Network (ASON) as defined in G.8080/Y.1304, Architecture for the automatically switched optical network (ASON) (February 2005), the contents of which are herein incorporated by reference, and the like. In another exemplary embodiment, the control plane may utilize Generalized Multi-Protocol Label Switching (GMPLS) Architecture as defined in Request for Comments: 3945 (October 2004), the contents of which are herein incorporated by reference, and the like. In yet another exemplary embodiment, the control plane may utilize Optical Signaling and Routing Protocol (OSRP) from Ciena Corporation of Linthicum, Md. which is an optical routing protocol similar to PNNI (Private Network-to-Network Interface) and MPLS (Multiprotocol Label Switching). Those of ordinary skill in the art will recognize the network and the control plane may utilize any type control plane for controlling the network elements and establishing connections therebetween.

The state machine 710 may be configured to implement the behaviors described herein. The DBs 712, 714, 716 may be stored in the memory 708 and/or the data store 706. The link DB 712 includes updated information related to each link in a network including delay D, T1, T2, for example. The topology DB 714 includes updated information related to the network topology, and the circuit DB 716 includes a listing of terminating circuits and transiting circuits at the network element 600 where the control module 700 is located. The control module 700 may utilize control plane mechanisms to maintain the DBs 712, 714, 716. For example, HELLO messages may be used to discover and verify neighboring ports, nodes, protection bundles, boundary links, and the like. Also, the DBs 712, 714, 716 may share topology state messages to exchange information to maintain identical data. Collectively, the state machine 710 and the DBs 712, 714, 716 may be utilized to advertise topology information, capacity availability, provide connection management (provisioning and restoration), and share synchronization and timestamp mapping data D, T1, and T2 for various links. Each link in a network may have various attributes associated with it such as, for example, line protection, available capacity, total capacity, administrative weight, protection bundle identification, delay, designation of boundary link, and the like. The state machine 710 and the DBs 712, 714, 716 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the control module 700 is configured to communicate to other control modules 700 in other nodes on the network. This communication may be either in-band or out-of-band. For SONET networks and similarly for SDH networks, the control module 700 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 8:
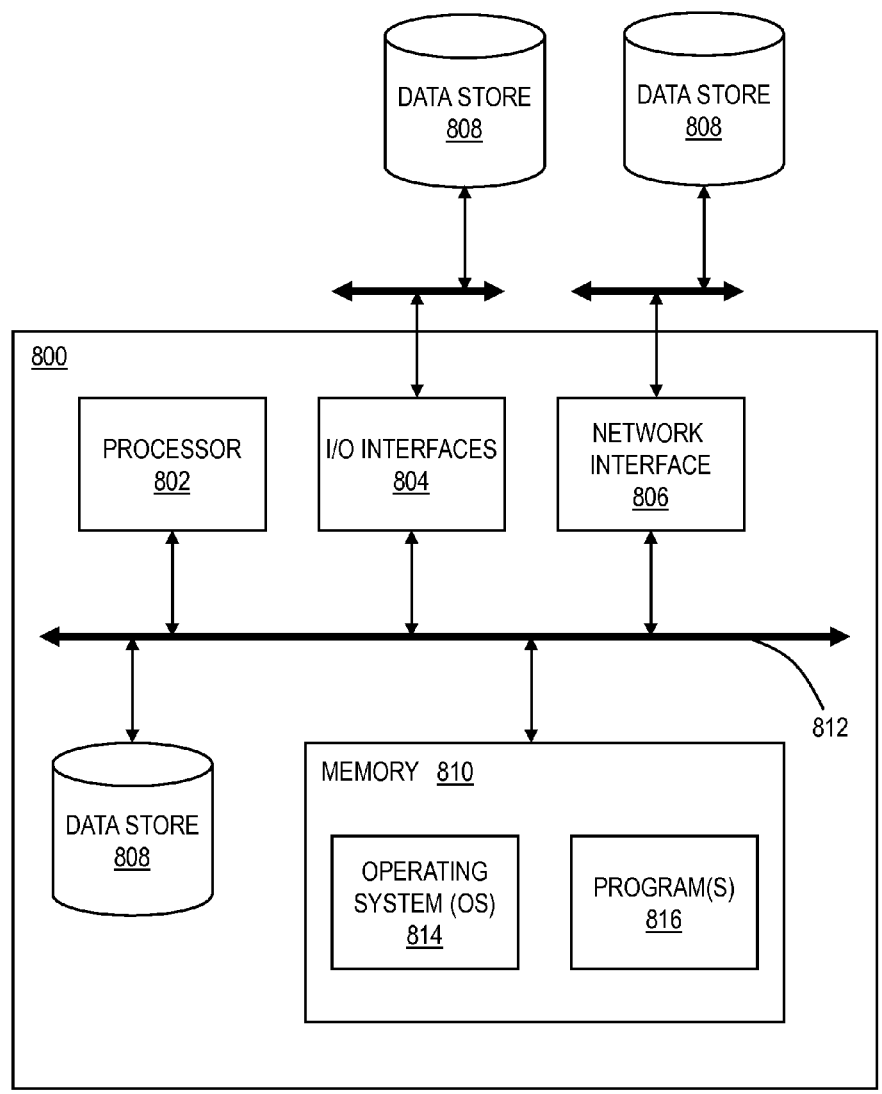
FIG. 8 is a block diagram of a server which may be used for implementation of a network or element management system.

Referring to FIG. 8, in an exemplary embodiment, a block diagram illustrates a server 800 which may be used for implementation of the management system 660. The server 800 may be a digital computer that, in terms of hardware architecture, generally includes a processor 802, input/output (I/O) interfaces 804, a network interface 806, a data store 808, and memory 810. It should be appreciated by those of ordinary skill in the art that FIG. 8 depicts the server 800 in an oversimplified manner, and a practical embodiment may include additional components and suitably configured processing logic to support known or conventional operating features that are not described in detail herein. The components (802, 804, 806, 808, and 810) are communicatively coupled via a local interface 812. The local interface 812 may be, for example but not limited to, one or more buses or other wired or wireless connections, as is known in the art. The local interface 812 may have additional elements, which are omitted for simplicity, such as controllers, buffers (caches), drivers, repeaters, and receivers, among many others, to enable communications. Further, the local interface 812 may include address, control, and/or data connections to enable appropriate communications among the aforementioned components.

The processor 802 is a hardware device for executing software instructions. The processor 802 may be any custom made or commercially available processor, a central processing unit (CPU), an auxiliary processor among several processors associated with the server 800, a semiconductor-based microprocessor (in the form of a microchip or chip set), or generally any device for executing software instructions. When the server 800 is in operation, the processor 802 is configured to execute software stored within the memory 810, to communicate data to and from the memory 810, and to generally control operations of the server 800 pursuant to the software instructions. The I/O interfaces 804 may be used to receive user input from and/or for providing system output to one or more devices or components. User input may be provided via, for example, a keyboard, touch pad, and/or a mouse. System output may be provided via a display device and a printer (not shown). I/O interfaces 804 can include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 806 may be used to enable the server 800 to communicate on a network, such as to the nodes 110, the network elements 600, the control modules 700, etc. The network interface 806 may include, for example, an Ethernet card or adapter (e.g., 10BaseT, Fast Ethernet, Gigabit Ethernet, 10GbE) or a wireless local area network (WLAN) card or adapter (e.g., 802.11a/b/g/n). The network interface 806 may include address, control, and/or data connections to enable appropriate communications on the network. A data store 808 may be used to store data. The data store 808 may include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 808 may incorporate electronic, magnetic, optical, and/or other types of storage media. In one example, the data store 808 may be located internal to the server 800 such as, for example, an internal hard drive connected to the local interface 812 in the server 800. Additionally in another embodiment, the data store 808 may be located external to the server 800 such as, for example, an external hard drive connected to the I/O interfaces 804 (e.g., SCSI or USB connection). In a further embodiment, the data store 808 may be connected to the server 800 through a network, such as, for example, a network attached file server.

The memory 810 may include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 810 may incorporate electronic, magnetic, optical, and/or other types of storage media. Note that the memory 810 may have a distributed architecture, where various components are situated remotely from one another, but can be accessed by the processor 802. The software in memory 810 may include one or more software programs, each of which includes an ordered listing of executable instructions for implementing logical functions. The software in the memory 810 includes a suitable operating system (O/S) 814 and one or more programs 816. The operating system 814 essentially controls the execution of other computer programs, such as the one or more programs 816, and provides scheduling, input-output control, file and data management, memory management, and communication control and related services. The one or more programs 816 may be configured to implement the various processes, algorithms, methods, techniques, etc. described herein.

In various exemplary embodiments, the programs 816 may include various components for providing OAM&P related function for the nodes 110, the network elements 600, etc. In an exemplary embodiment, the programs 816 may include a diagnosis tool which generally may be configured to implement the systems and methods described herein to, for example, 1) provide network-wide clock synchronization in OTN; 2) provide a network-wide timestamp mapping between different nodes 110; and 3) provide an integrated user interface for diagnosing root causes of failures and events or performing network performance diagnostics. Specifically, the diagnosis tool may provide a front end interface for scheduling or implementing the methods 400, 500 along with an interface for event log analysis with the event log including synchronization or mapping of events between different nodes such that the events are in a sequential order in time.

The management system 660 may be configured to obtain a plurality of events through event logs for a plurality of managed nodes. These event logs may be used by engineers and network operators to perform root cause analysis, diagnosis performance, etc. In an exemplary embodiment, the nodes 110 may be configured to provide the events and event logs to the management system 660 along with a timestamp mapping for each node 110. For example, assume the methods 400, 500 were performed on a network with a plurality of nodes. In the method 500, a single node is designated as a root node. The various parameters D, T1, T2 may be utilized to provide a mapping from all nodes in the network to the root node such that all events may be properly sequenced in time. The mapping between the root node and its children may be derived from the associated D, T1, T2. The mapping being children of the root node and their children may include another set of D, T1, T2. However, the grandchildren of the root node may still have a timestamp mapping to the root node by using both sets of mappings (root node-->child node and child node-->grandchild node). This process enables an optical network, such as OTN, to maintain sequential ordering of events despite the fact that the optical network has slight variation due to internal clocks and delay time in transmission.

The management system 660 may include a consolidator program 816 that is configured to: 1) download event logs from nodes along with timestamp mapping to some fixed point; and 2) combine the event logs together to form a single or unified log while simultaneously utilizing the timestamp mapping to sequentially order events from different event logs into the unified log in proper order. Importantly, from an engineer or network operator's perspective, event logs must have events in a proper sequence. Specifically, absolute time is not as important as being accurate with respect to when events occurred relative to one another. The consolidator program 816 may provide the single or unified log for an entire network with all events contained therein properly order utilized the systems and methods described herein.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for synchronization and timestamp mapping in an optical network, comprising:
classifying a first node as a master node and a second node as a slave node;
performing a delay measurement between the master node and the slave node, the slave node determining a second time reference based on when the slave node responds to the delay measurement from the master node;
upon completion of the delay measurement, sending from the master node a measured delay and a first time reference to the slave node, the delay comprising a measured delay between the master node and the slave node, and the time reference comprising a time when the master node receives the slave node's response to the delay measurement;
utilizing the measured delay, the first time reference, and the second time reference by the master node and the slave node to determine a sequential order of events therebetween;
operating a plurality of nodes in addition to the first node and the second node;
defining a tree of ordered nodes comprising the plurality of nodes, the first node, and the second node; and
performing the classifying, the performing, the sending, and the utilizing steps in a recursive manner through the tree to define a network-wide mapping between each of the plurality of nodes, the first node, and the second node.

2. The method of claim 1, further comprising:
defining a mapping between the master node and the slave node based on the measured delay, the first time reference, and the second time reference; and
logging events at each of the master node and the slave node with the mapping utilized to sequentially order the events.

3. The method of claim 1, further comprising:
operating Optical Transport Network on a link between the master node and the slave node.

4. The method of claim 3, further comprising:
selecting one of a plurality of ports on the link; and
performing the delay measurement utilizing delay measurement data in overhead of the one of the plurality of ports.

5. The method of claim 4, further comprising:
determining the delay and the first time reference based on a time associated with a clock on the master node instead of counting a number of frames.

6. The method of claim 4, further comprising:
performing a plurality of delay measurements to obtain a plurality of values for the delay, the first time reference, and the second time reference; and
applying statistics to the plurality of values to determine the delay, the first time reference, and the second time reference.

7. The method of claim 3, further comprising:
providing events from the master node and the slave node to a management system; and
utilizing the measured delay, the first time reference, and the second time reference to store the events in an event log in proper sequential order.

8. The method of claim 3, further comprising:
performing the delay measurement only if the link is free from defects or errors associated with Optical Transport Network.

9. The method of claim 3, further comprising:
sending from the master node a measured delay and a first time reference to the slave node utilizing a control plane.

10. The method of claim 1, further comprising:
utilizing the network-wide mapping to determine a sequential order of events between the plurality of nodes, the first node, and the second node.

11. An optical network, comprising:
a first node;
a second node;
a plurality of Optical Transport Network ports on a link between the first node and the second node;

wherein the first node and the second node are configured to perform synchronization and timestamp mapping therebetween, the synchronization and timestamp mapping comprises:

the first node performing a delay measurement with the second node, the second node determining a second time reference based on when the second node responds to the delay measurement from the first node;

upon completion of the delay measurement, the first node sending a measured delay and a first time reference to the second node, the delay comprising a measured delay between the first node and the second node, and the time reference comprising a time when the first node receives the second node's response to the delay measurement; and the first node and the second node utilizing the measured delay, the first time reference, and the second time reference to determine a sequential order of events therebetween; and a plurality of nodes in addition to the first node and the second node, the plurality of nodes communicatively coupled to the first node and the second node through a plurality of links operating Optical Transport Network;

wherein the synchronization and timestamp mapping further comprises a tree of ordered nodes comprising the plurality of nodes, the first node, and the second node, and wherein the synchronization and timestamp mapping is performed in a recursive manner through the tree to define a network-wide mapping between each of the plurality of nodes, the first node, and the second node.

12. The optical network of claim 11, wherein the synchronization and timestamp mapping further comprises:

the first node and the second node defining a mapping therebetween based on the measured delay, the first time reference, and the second time reference; and the first node and the second node each logging events with the mapping utilized to sequentially order the events.

13. The optical network of claim 11, wherein the synchronization and timestamp mapping further comprises:

the first node selecting one of the plurality of Optical Transport Network ports; and the first node and the second node performing the delay measurement utilizing delay measurement data in overhead of the one of the plurality of Optical Transport Network ports.

14. The optical network of claim 13, wherein the synchronization and timestamp mapping further comprises:

the first node determining the delay and the first time reference based on a time associated with a clock on the first node instead of counting a number of frames.

15. The optical network of claim 13, wherein the synchronization and timestamp mapping further comprises:

the first node and the second node performing a plurality of delay measurements to obtain a plurality of values for the delay, the first time reference, and the second time reference; and the first node applying statistics to the plurality of values to determine the delay, the first time reference, and the second time reference.

16. The optical network of claim 13, further comprising:

a management system communicatively coupled to the first node and the second node;

wherein the management system is configured to receive events from the first node and the second node, and to utilize the measured delay, the first time reference, and the second time reference to store the events in an event log in proper sequential order.

17. The optical network of claim 13, further comprising:

a control plane operating between the first node and the second node, wherein the control plane is configured to communicate the measured delay and the first time reference to the second node from the first node.

18. A network element, comprising:

a plurality of ports configured to be switched therebetween;

a control module communicatively coupled to the plurality of ports, wherein the control module is configured to:

define a node communicatively coupled to one of the plurality of ports as a slave node;

perform a delay measurement to the slave node, the slave node determining a second time reference based on when the slave node responds to the delay measurement from the network element;

upon completion of the delay measurement, send a measured delay and a first time reference to the slave node, the delay comprising a measured delay to the slave node, and the time reference comprising a time when the network element receives the slave node's response to the delay measurement; and utilize the measured delay, the first time reference, and the second time reference to determine a sequential order of events between the network element and the slave node; and a plurality of additional nodes communicatively coupled to the network element and the slave node through a plurality of links operating Optical Transport Network;

wherein the synchronization and timestamp mapping further comprises a tree of ordered nodes comprising the plurality of nodes, the network element, and the slave node, and wherein the synchronization and timestamp mapping is performed in a recursive manner through the tree to define a network-wide mapping between each of the plurality of nodes, the network element node, and the slave node.

* * * * *